US012609881B2

(12) United States Patent     (10) Patent No.:   US 12,609,881 B2

Mattes et al.     (45) Date of Patent:    Apr. 21, 2026

(54) BI-DIRECTIONAL TUNNEL PROBING IN A MULTI-REALM NETWORK

(71) Applicant: Microsoft Technology Licensing, LLC, Redmond, WA (US)

(72) Inventors: Paul David Mattes, Saint Paul, MN (US); Umesh Krishnaswamy, San Jose, CA (US); Ashlesha Atrey, Sunnyvale, CA (US); Guruprasad Bangalore Hiriyannaiah, Fremont, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 299 days.

(21) Appl. No.: 18/318,687

(22) Filed: May 16, 2023

(65) Prior Publication Data

US 2024/0348475 A1     Oct. 17, 2024

Related U.S. Application Data

(60) Provisional application No. 63/496,353, filed on Apr. 14, 2023.

(51) Int. Cl.
    *H04L 43/10*       (2022.01)
    *H04L 12/46*       (2006.01)
        (Continued)

(52) U.S. Cl.
    CPC .......... *H04L 43/10* (2013.01); *H04L 12/4633* (2013.01); *H04L 45/50* (2013.01); *H04L 45/745* (2013.01)

(58) Field of Classification Search
    CPC ...................................................... H04L 43/10
    See application file for complete search history.

(56) References Cited

U.S. PATENT DOCUMENTS

| | | | |
|---|---|---|---|
| 7,773,611 B2 | 8/2010 | Booth, III et al. | |
| 7,796,524 B1 | 9/2010 | O'Connell | |

(Continued)

FOREIGN PATENT DOCUMENTS

| | | |
|---|---|---|
| CN | 103929319 B | 2/2018 |
| CN | 113709000 A | 11/2021 |
| EP | 3732832 B1 | 8/2022 |

OTHER PUBLICATIONS

Non-Final Office Action mailed on Apr. 15, 2025, in U.S. Appl. No. 18/379,219 22 Pages.

(Continued)

*Primary Examiner* — Jason E Mattis

(74) *Attorney, Agent, or Firm* — Foley IP Law, PLLC

(57) ABSTRACT

Bi-directional tunnel probing in a network may be extended to multi-realm networks, providing bi-directional probing in a multi-realm network. Bi-directional probing uses probe packets with a forward tunnel label, a reverse tunnel label, and an IP packet header. Bi-directional probing in a multi-realm network uses a forward tunnel label, an SID, a reverse tunnel label, and an IP packet header. Penultimate hop popping strips the outermost labels in a specific order. The SID gets the probe packet back into the originating realm, and the reverse tunnel label returns the probe packet along the reverse direction of the tunnel. No SID is needed for intra-realm probing, and the IP packet header is used to return the probe packet if the reverse tunnel label is absent.

20 Claims, 9 Drawing Sheets

(51) Int. Cl.
    *H04L 45/50*       (2022.01)
    *H04L 45/745*     (2022.01)

(56) References Cited

U.S. PATENT DOCUMENTS

| | | | |
|---|---|---|---|
| 10,320,691 B1 | 6/2019 | Matthews | |
| 10,547,500 B1 | 1/2020 | Hardman et al. | |
| 11,082,338 B1 | 8/2021 | Saha | |
| 11,088,871 B1 | 8/2021 | Lin | |
| 11,323,948 B2 | 5/2022 | Magadevan | |
| 11,929,924 B1 * | 3/2024 | Neustadter | H04L 45/566 |
| 12,243,420 B1 | 3/2025 | Rothschild | |
| 2005/0083197 A1 | 4/2005 | Glenn | |
| 2007/0121626 A1 | 5/2007 | Shepard | |
| 2008/0049629 A1 | 2/2008 | Morrill | |
| 2008/0049641 A1 | 2/2008 | Edwards | |
| 2008/0049775 A1 | 2/2008 | Morrill | |
| 2008/0052628 A1 | 2/2008 | Bugenhagen et al. | |
| 2008/0195733 A1 * | 8/2008 | Detienne | H04L 12/4633 |
| | | | 709/224 |
| 2009/0031022 A1 | 1/2009 | Wexler | |
| 2012/0140626 A1 | 6/2012 | Anand | |
| 2013/0100953 A1 | 4/2013 | Li | |
| 2013/0128022 A1 | 5/2013 | Bose | |
| 2013/0254378 A1 | 9/2013 | Meylan | |
| 2014/0068750 A1 | 3/2014 | Tjahjono | |
| 2014/0362681 A1 | 12/2014 | Bahadur | |
| 2015/0358366 A1 | 12/2015 | Liang | |
| 2016/0381101 A1 | 12/2016 | Tse | |
| 2017/0099180 A1 * | 4/2017 | Singh | H04L 12/4641 |
| 2019/0059017 A1 | 2/2019 | Rahkala | |
| 2019/0068402 A1 | 2/2019 | Mazarick | |
| 2019/0222505 A1 | 7/2019 | Kaneko | |
| 2019/0386954 A1 | 12/2019 | Lau | |
| 2020/0037226 A1 | 1/2020 | Magadevan | |
| 2020/0059976 A1 | 2/2020 | Bhatia et al. | |
| 2020/0213212 A1 * | 7/2020 | Dillon | H04L 43/0829 |
| 2020/0304605 A1 | 9/2020 | Lin | |
| 2020/0336401 A1 * | 10/2020 | Cociglio | H04L 43/50 |
| 2020/0382402 A1 | 12/2020 | Kolar | |
| 2021/0144791 A1 | 5/2021 | Kang | |
| 2021/0218658 A1 | 7/2021 | Vasseur | |
| 2021/0281491 A1 | 9/2021 | Yelahanka Raghuprasad | |
| 2021/0297345 A1 | 9/2021 | Sawyer | |
| 2021/0320820 A1 | 10/2021 | Ruan et al. | |
| 2022/0060393 A1 | 2/2022 | Vasseur | |
| 2023/0024980 A1 | 1/2023 | Li | |
| 2023/0031921 A1 | 2/2023 | Devendran | |
| 2023/0179685 A1 | 6/2023 | Madhur Comandur | |
| 2024/0031264 A1 | 1/2024 | Nigam | |
| 2024/0214905 A1 | 6/2024 | Qiu | |
| 2024/0348775 A1 | 10/2024 | Toma | |
| 2025/0126069 A1 | 4/2025 | Garg | |

OTHER PUBLICATIONS

International Search Report and Written Opinion received for PCT Application No. PCT/US2024/022922, mailed on Jul. 22, 2024, 16 pages.

"Intermediate System to Intermediate System Intradomain Routeing Information Exchange Protocol for Use in Conjunction with the Protocol for Providing the Connectionless-Mode Network Service (ISO 8473)", Retrieved from: https://www.iso.org/standard/30932. html, Nov. 2002, 201 Pages.

Applegate, et al., "Coping With Network Failures: Routing Strategies For Optimal Demand Oblivious Restoration", In Proceedings of the Joint International Conference on Measurement and Modeling of Computer Systems, Jun. 10, 2004, pp. 270-281.

Awduche, et al., "RSVP-TE: Extensions to RSVP for LSP Tunnels", Retrieved From: https://datatracker.ietf.org/doc/rfc3209/, Dec. 2001, 54 Pages.

Bogle, et al., "TEAVAR: Striking the Right Utilization-Availability Balance in WAN Traffic Engineering", In Proceedings of the ACM Special Interest Group on Data Communication, Aug. 19, 2019, pp. 29-43.

Caesar, et al., "Design And Implementation Of A Routing Control Platform", In Proceedings of the 2nd Symposium on Networked Systems Design & Implementation, May 2, 2005, pp. 15-28.

Elwalid, et al., "MATE: MPLS adaptive traffic engineering", In Proceedings of IEEE INFOCOM, vol. 3, Apr. 22, 2001, pp. 1300-1309.

Feamster, et al., "Guidelines for interdomain traffic engineering", In Journal of ACM SIGCOMM Computer Communication Review, vol. 33, Issue 5, Oct. 1, 2003, pp. 19-30.

Feldmann, et al., "Deriving Traffic Demands for Operational IP Networks: Methodology and Experience", In Journal of IEEE/ACM Transactions on Networking, vol. 9, Issue 3, Jun. 2001, pp. 265-279.

Fernandez, et al., "Building Express Backbone: Facebook's New Long-Haul Network", Retrieved from:https://engineering.fb.com/2017/05/01/data-center-engineering/building-express-backbone-facebook-s-new-long-haul-network/, May 1, 2017, 7 Pages.

Filsfils, et al., "Segment Routing Architecture", Retrieved From: https://datatracker.ietf.org/doc/rfc8402/, Jul. 2018, 29 Pages.

Forrest, John, "COIN-OR linear programming solver", Retrieved From: https://github.com/coin-or/Clp, Jan. 12, 2022, 9 Pages.

Goldberg, et al., "Network Flow Algorithms", In Publication of Springer-Verlag, Jan. 1990, pp. 101-164.

Gupta, et al., "SDX: A Software Defined Internet Exchange", In Proceedings of ACM SIGCOMM, Aug. 14, 2014, pp. 551-562.

Hong, et al., "Achieving High Utilization with Software-Driven WAN", In Proceedings of ACM SIGCOMM, Aug. 27, 2013, pp. 15-26.

Hong, et al., "B4 and After: Managing Hierarchy, Partitioning, and Asymmetry for Availability and Scale in Google's Software-Defined WAN", In Proceedings of the Conference of the ACM Special Interest Group on Data Communication, Aug. 20, 2018, pp. 74-87.

Jain, et al., "B4: Experience with a Globally-Deployed Software Defined WAN", In Proceedings of the ACM SIGCOMM Conference on SIGCOMM, Aug. 12, 2013, pp. 3-14.

Jin, et al., "Dynamic Scheduling of Network Updates", In Proceedings of ACM SIGCOMM, Aug. 17, 2014, pp. 539-550.

Kandula, et al., "Calendaring for Wide Area Networks", In Proceedings of ACM SIGCOMM, Aug. 17, 2014, pp. 515-526.

Kandula, et al., "Walking the Tightrope: Responsive Yet Stable Traffic Engineering", In Journal of ACM SIGCOMM Computer Communication Review, vol. 35, Issue 4, Aug. 22, 2005, pp. 253-264.

Katz, et al., "Bidirectional Forwarding Detection", Retrieved From: https://www.rfc-editor.org/rfc/rfc5880.html, Jun. 2010, 46 Pages.

Katz, et al., "Bidirectional Forwarding Detection (BFD) for Multihop Paths", Retrieved from: https://www.rfc-editor.org/rfc/pdfrfc/rfc5883. txt.pdf, Jun. 2010, 6 Pages.

Krishnaswamy, et al., "Decentralized cloud wide-area network traffic engineering with Blastshield", In Proceedings of the 19th USENIX Symposium on Networked Systems Design and Implementation, Apr. 4, 2022, pp. 325-338.

Krishnaswamy, et al., "OneWAN is better than two: Unifying a split WAN architecture", In Proceedings of the 20th USENIX Symposium on Networked Systems Design and Implementation, Apr. 17, 2023, pp. 515-529.

Kumar, et al., "Semi-Oblivious Traffic Engineering: The Road Not Taken", In Proceedings of USENIX NSDI, Apr. 9, 2018, pp. 157-170.

Laoutaris, et al., "Inter-Datacenter Bulk Transfers with NetStitcher", In Proceedings of ACM SIGCOMM, Aug. 15, 2011, pp. 74-85.

Liu, et al., "Traffic Engineering with Forward Fault Correction", In Proceedings of the ACM Conference on SIGCOMM, Aug. 17, 2014, pp. 527-538.

Medina, et al., "Traffic Matrix Estimation: Existing Techniques and New Directions", In Proceedings of ACM SIGCOMM, Aug. 19, 2002, pp. 161-174.

Mitra, et al., "A Case Study of Multiservice, Multipriority Traffic Engineering Design for Data Networks", In Proceedings of IEEE GLOBECOM, Dec. 5, 1999, pp. 1077-1083.

(56)                    References Cited

OTHER PUBLICATIONS

Mizux, "OR-Tools—Google Optimization Tools", Retrieved From: https://github.com/google/or-tools, Nov. 28, 2022, 8 Pages.

Nygren, et al., "OpenFlow Switch Specification", Retrieved From: https://opennetworking.org/wp-content/uploads/2014/10/openflow-switch-v1.5.1.pdf, Mar. 26, 2015, 283 Pages.

Pan, et al., "Fast Reroute Extensions to RSVP-TE for LSP Tunnels", Retrieved From: https://datatracker.ietf.org/doc/rfc4090/, May 2005, 34 Pages.

Phaal, et al., "sFlow Version 5", Retrieved From: https://sflow.org/sflow_version_5.txt, Jul. 2004, 49 Pages.

Rosen, et al., "Multiprotocol Label Switching Architecture", Retrieved From: https://www.rfc-editor.org/rfc/rfc3031, Jan. 2001, 57 Pages.

Roughan, et al., "Traffic Engineering with Estimated Traffic Matrices", In Proceedings of the 3rd ACM SIGCOMM Conference on Internet Measurement, Oct. 27, 2003, pp. 248-258.

Sadasivan, et al., "Architecture for IP Flow Information Export", Retrieved from: https://www.rfc-editor.org/rfc/pdfrfc/rfc5470.txt.pdf, Mar. 2009, 31 Pages.

Schlinker, et al., "Engineering Egress with Edge Fabric: Steering Oceans of Content to the World", In Proceedings of ACM SIGCOMM, Aug. 7, 2017, pp. 418-431.

Singh, et al., "Cost-effective cloud edge traffic engineering with Cascara", In Proceedings of 18th USENIX Symposium on Networked Systems Design and Implementation, Apr. 12, 2021, pp. 201-216.

Wang, et al., "COPE: Traffic Engineering in Dynamic Networks", In Proceedings of the conference on Applications, technologies, architectures, and protocols for computer communications, Sep. 2006, pp. 99-110.

Yap, et al., "Taking the edge off with espresso: Scale, reliability and programmability for global internet peering", In Proceedings of the Conference of the ACM Special Interest Group on Data Communication, Aug. 2017, pp. 432-445.

Zhang, et al., "Fast accurate computation of large-scale IP traffic matrices from link loads", In Proceedings of ACM SIGMETRICS, Jun. 10, 2003, pp. 206-217.

International Search Report and Written Opinion received for PCT Application No. PCT/US2024/048041, Dec. 19, 2024, 15 pages.

International Preliminary Report on Patentability (Chapter I) received for PCT Application No. PCT/US2024/022922, mailed on Oct. 23, 2025, 11 pages.

Final Office Action mailed on Jul. 30, 2025, in U.S. Appl. No. 18/379,219 26 Pages.

Non-Final Office Action mailed on Jan. 7, 2026, in U.S. Appl. No. 18/379,219, 31 pages.

* cited by examiner

Figure 2:
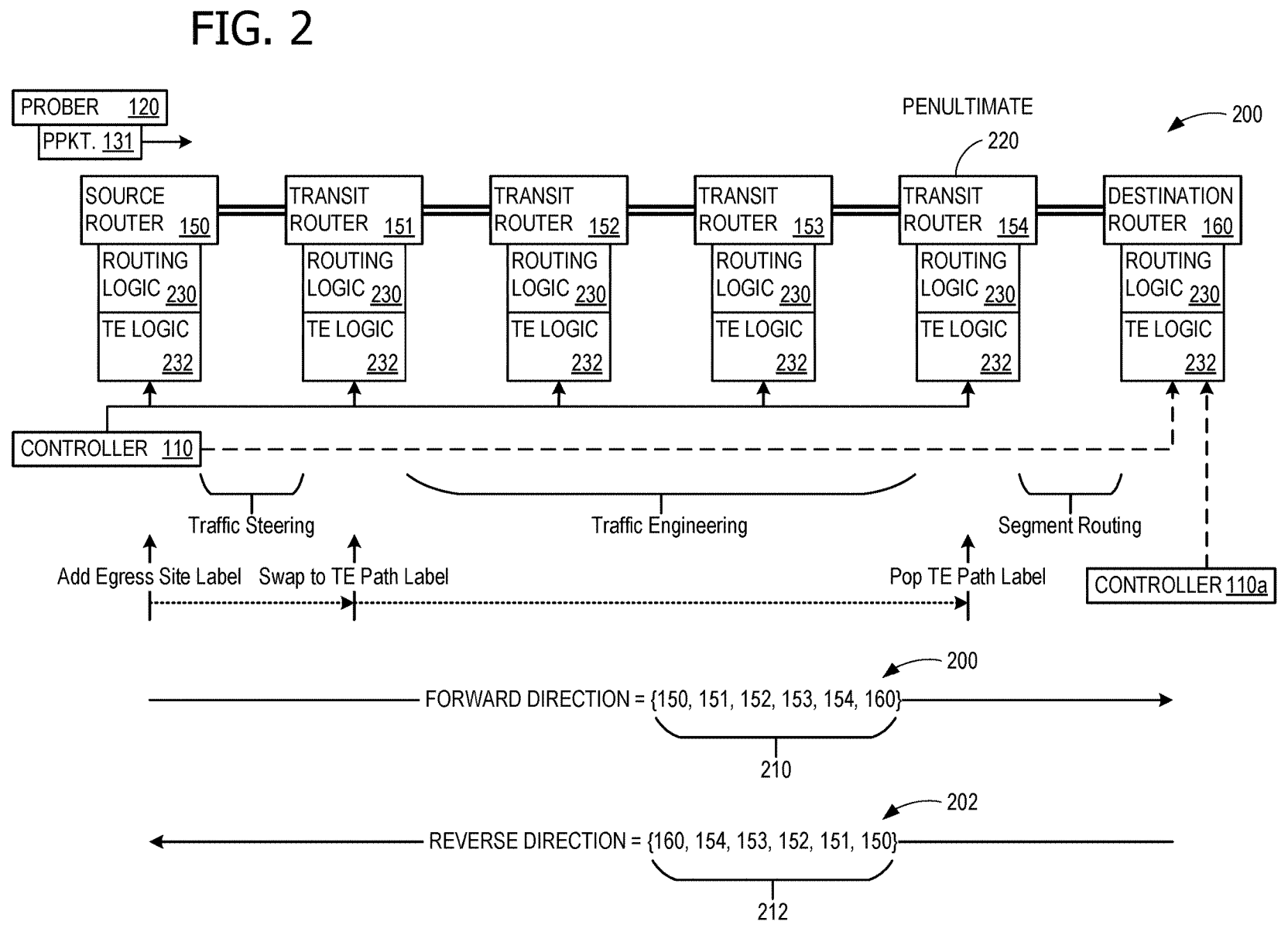

PROBER  120
PPKT.  131

SOURCE ROUTER  150
ROUTING LOGIC  230
TE LOGIC  232

TRANSIT ROUTER  151
ROUTING LOGIC  230
TE LOGIC  232

TRANSIT ROUTER  152
ROUTING LOGIC  230
TE LOGIC  232

TRANSIT ROUTER  153
ROUTING LOGIC  230
TE LOGIC  232

PENULTIMATE
220

TRANSIT ROUTER  154
ROUTING LOGIC  230
TE LOGIC  232

DESTINATION ROUTER  160
ROUTING LOGIC  230
TE LOGIC  232

CONTROLLER  110a

CONTROLLER  110

Segment Routing

Traffic Engineering

Traffic Steering

Add Egress Site Label   Swap to TE Path Label   Pop TE Path Label

FORWARD DIRECTION = {150, 151, 152, 153, 154, 160}   210

REVERSE DIRECTION = {160, 154, 153, 152, 151, 150}   212

FIG. 5A
500a
| SOURCE 150 | RTR. 151 | RTR. 152 | RTR. 153 | RTR. 154 | DEST. 160 |
———————————FORWARD LABEL PATH——————————→ SEG. RTG. →
←——————————IP HEADER PATH (ANY WORKING ROUTE)——————————
FIG. 5B
500b
| SOURCE 150 | RTR. 151 | RTR. 152 | RTR. 153 | RTR. 154 | DEST. 160 |
———————————FORWARD LABEL PATH——————————→ SEG. RTG. →
↑ SEG. RTG. ←——————————REVERSE LABEL PATH——————————
FIG. 5C
500c
| SOURCE 150 | RTR. 151 | RTR. 152 | RTR. 153 | RTR. 154 | DEST. 160 |
———————————FORWARD LABEL PATH——————————→ SEG. RTG. →
↑ SEG. RTG. ↑ ——————REVERSE LABEL PATH——————↑ ——SID——
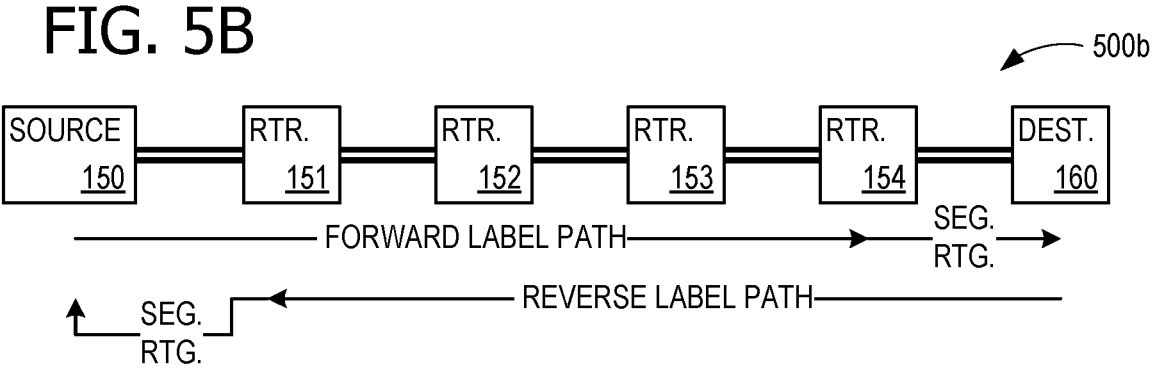
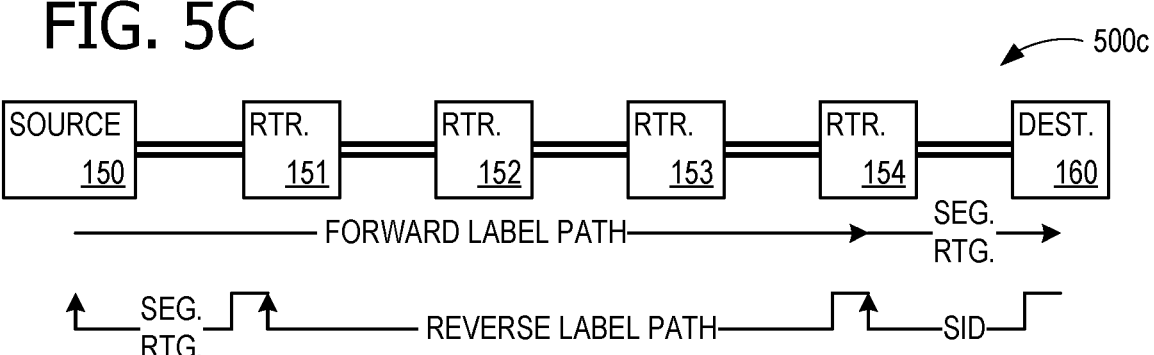

FIG. 8

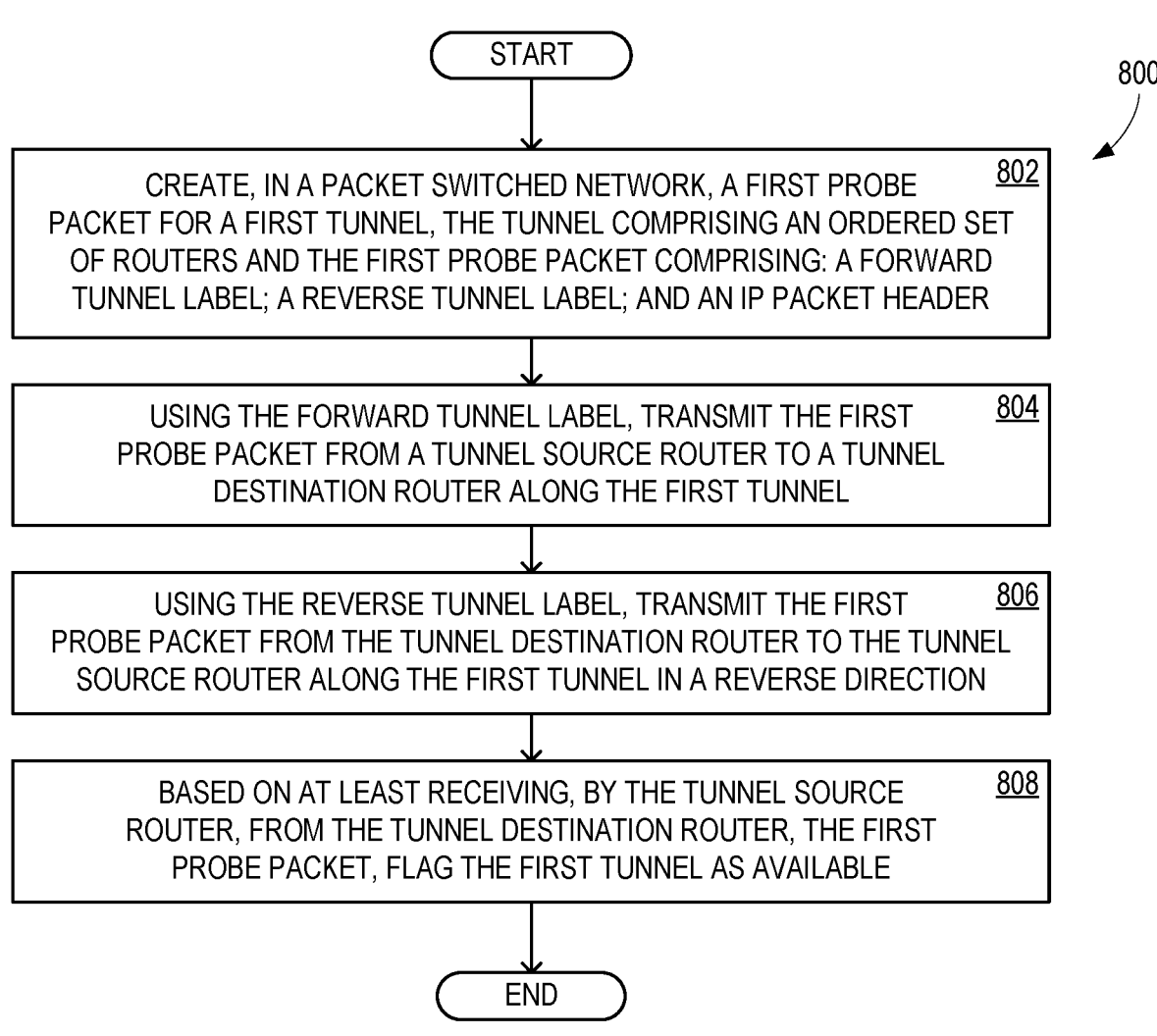

800

START

CREATE, IN A PACKET SWITCHED NETWORK, A FIRST PROBE     802
PACKET FOR A FIRST TUNNEL, THE TUNNEL COMPRISING AN ORDERED SET
OF ROUTERS AND THE FIRST PROBE PACKET COMPRISING: A FORWARD
TUNNEL LABEL; A REVERSE TUNNEL LABEL; AND AN IP PACKET HEADER

USING THE FORWARD TUNNEL LABEL, TRANSMIT THE FIRST     804
PROBE PACKET FROM A TUNNEL SOURCE ROUTER TO A TUNNEL
DESTINATION ROUTER ALONG THE FIRST TUNNEL

USING THE REVERSE TUNNEL LABEL, TRANSMIT THE FIRST     806
PROBE PACKET FROM THE TUNNEL DESTINATION ROUTER TO THE TUNNEL
SOURCE ROUTER ALONG THE FIRST TUNNEL IN A REVERSE DIRECTION

BASED ON AT LEAST RECEIVING, BY THE TUNNEL SOURCE     808
ROUTER, FROM THE TUNNEL DESTINATION ROUTER, THE FIRST
PROBE PACKET, FLAG THE FIRST TUNNEL AS AVAILABLE

END

Figure 9:
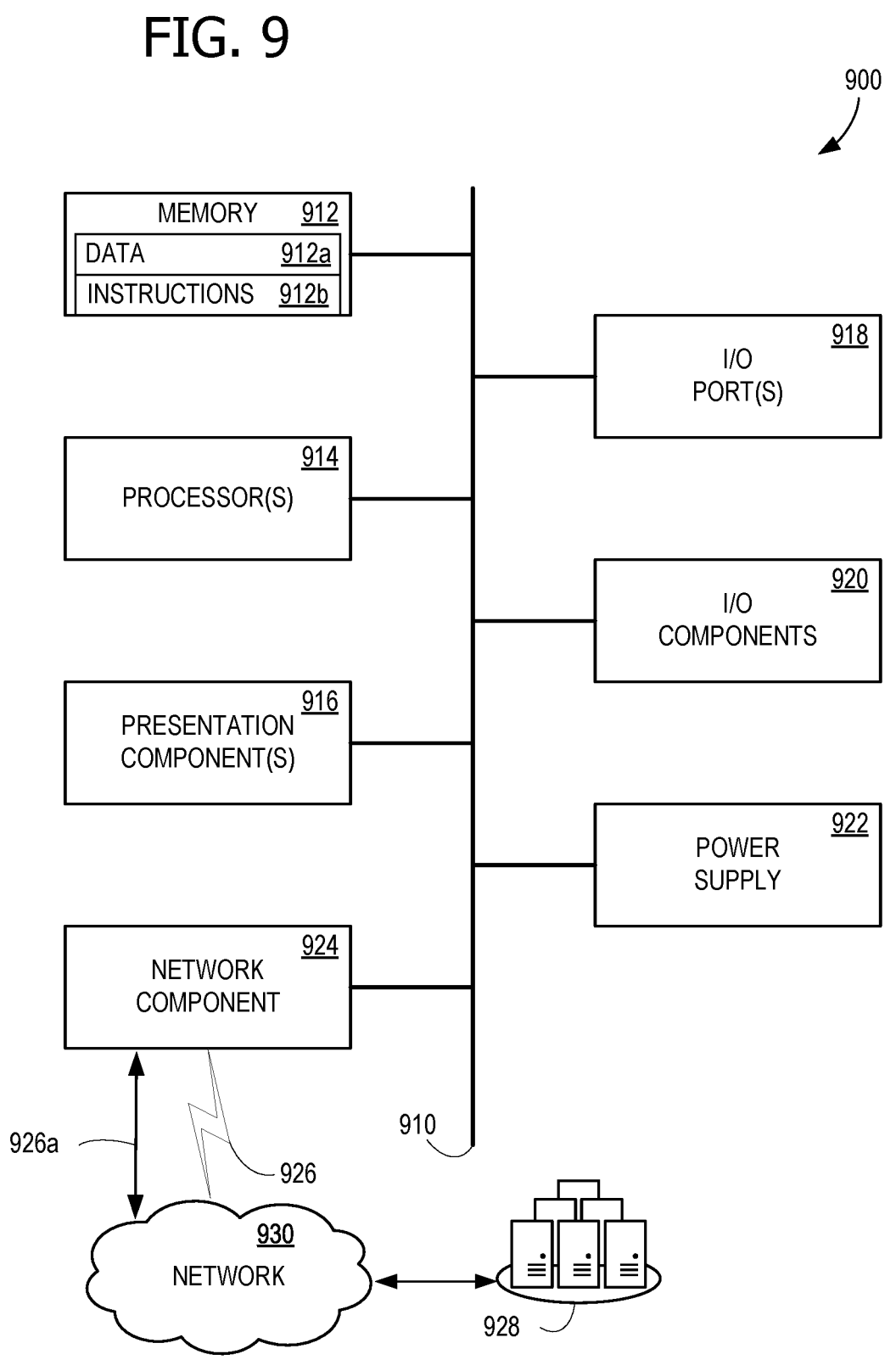

| MEMORY | 912 |
|---|---|
| DATA | 912a |
| INSTRUCTIONS | 912b |

PROCESSOR(S) 914

PRESENTATION COMPONENT(S) 916

NETWORK COMPONENT 924

I/O PORT(S) 918

I/O COMPONENTS 920

POWER SUPPLY 922

910

926a

926

930 NETWORK

928

BI-DIRECTIONAL TUNNEL PROBING IN A MULTI-REALM NETWORK

CROSS-REFERENCE TO RELATED APPLICATION

This application claims priority to U.S. Provisional Patent Application No. 63/496,353, entitled "BI-DIRECTIONAL TUNNEL PROBING IN A MULTI-REALM NETWORK," filed on Apr. 14, 2023, the disclosure of which is incorporated herein by reference in its entirety.

BACKGROUND

The liveness of traffic engineering tunnels in packet-switched networks is measured using probe packets sent from an agent or other entity at the ingress of the tunnel. The probe packet travels along the tunnel exercising the same routes and interfaces as a normal data packet. Since tunnels are uni-directional, the probe packet returns back from the tunnel destination to the tunnel source using routes created by another protocol such as an interior gateway protocol (IGP).

When a network is sliced into multiple realms, a traffic engineering controller that constructs the tunnels is only able to control the routers within its own realm. This permits tunnels to within a realm to reach only to a boundary router of an adjacent realm. This means that the tunnel destination is the boundary router of the adjacent realm (i.e., the first router that can be reached in the adjacent realm).

SUMMARY

The disclosed examples are described in detail below with reference to the accompanying drawing figures listed below. The following summary is provided to illustrate some examples disclosed herein.

Example solutions for bi-directional tunnel probing in a network include: creating, in a packet switched network, a first probe packet for a first tunnel, the first tunnel comprising an ordered set of routers and the first probe packet comprising: a forward tunnel label; a reverse tunnel label; and an IP packet header; using the forward tunnel label, transmitting the first probe packet from a tunnel source router to a tunnel destination router along the first tunnel using the reverse tunnel label, transmitting the first probe packet from the tunnel destination router to the tunnel source router along the first tunnel in a reverse direction; and based on at least receiving, by the tunnel source router, from the tunnel destination router, the first probe packet, flagging the first tunnel as available.

BRIEF DESCRIPTION OF THE DRAWINGS

The disclosed examples are described in detail below with reference to the accompanying drawing figures listed below:

FIG. 1 illustrates an example architecture that advantageously provides for bi-directional tunnel probing, tunnel probing in a multi-realm network, and even bi-directional tunnel probing in a multi-realm network;

FIG. 2 illustrates further detail for an exemplary tunnel, such as may be used in the example architecture of FIG. 1;

FIG. 3 illustrates further detail when the example architecture of FIG. 1 includes a multi-realm network;

FIGS. 5A, 5B, and 5C illustrate exemplary probe packet paths, such as may occur in the example architecture of FIG. 1;

FIGS. 6, 7, and 8 show flowcharts illustrating exemplary operations that may be performed when using example architectures, such as the architecture of FIG. 1; and FIG. 9 shows a block diagram of an example computing device suitable for implementing some of the various examples disclosed herein.

Corresponding reference characters indicate corresponding parts throughout the drawings.

DETAILED DESCRIPTION

Figure 4A:
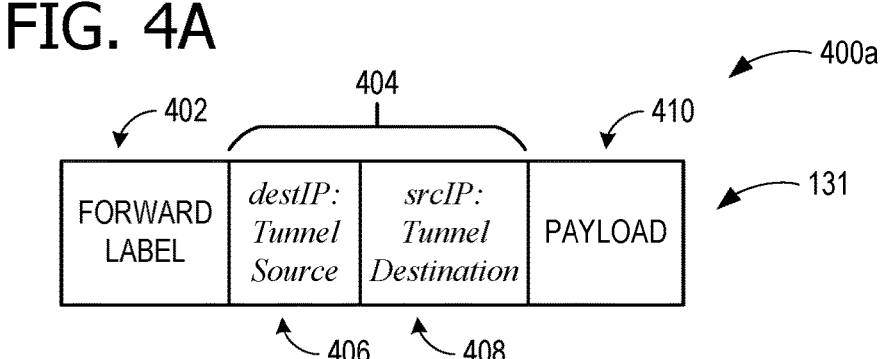
FIGS. 4A, 4B, and 4C illustrate exemplary probe packet envelopes, such as may be used in the example architecture of FIG. 1.

Traditional probe packets may fail to return due to faults in the return path defined by an interior gateway protocol (IGP), even when the tunnel is intact and performing well, resulting in a false indication of tunnel failure. The tunnel is then abandoned. The false indication of tunnel failure causes unnecessary disruption to network traffic.

Example solutions for bi-directional tunnel probing in a network include: creating, in a packet switched network, a first probe packet for a first tunnel, the first tunnel comprising an ordered set of routers and the first probe packet comprising: a forward tunnel label; a reverse tunnel label; and an IP packet header; using the forward tunnel label, transmitting the first probe packet from a tunnel source router to a tunnel destination router along the first tunnel; using the reverse tunnel label, transmitting the first probe packet from the tunnel destination router to the tunnel source router along the first tunnel in a reverse direction; and based on at least receiving, by the tunnel source router, from the tunnel destination router, the first probe packet, flagging the first tunnel as available.

Disclosed solutions for bi-directional tunnel probing in a network may optionally be combined with solutions for tunnel probing in a multi-realm network, providing for bi-directional tunnel probing in a multi-realm network. Bi-directional tunnel probing uses probe packets with a forward tunnel label, a reverse tunnel label, and an internet protocol (IP) packet header, in that order. Tunnel probing in a multi-realm network uses probe packets with a forward tunnel label and an IP packet header, in that order. Bi-directional tunnel probing in a multi-realm network uses probe packets with a forward tunnel label, a segment identifier (SID), a reverse tunnel label, and an IP packet header, in that order. Penultimate hop popping is used to strip off the outermost labels in a specific order. The forward tunnel label moves the probe packet along the tunnel to the tunnel destination; the SID gets the probe packet back into the originating realm; and the reverse tunnel label returns the probe packet to the tunnel source along the reverse direction of the tunnel. No SID is needed for intra-realm only probe packets. Absent the reverse tunnel label, the probe packet is returned to the tunnel source using the IP packet header. This scheme precludes false indications of tunnel failure.

The example solutions described herein improve the speed and reliability of packet-switched networks. This is accomplished by reducing false indications of tunnel failure, which result in the unnecessary closure of functioning tunnels.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
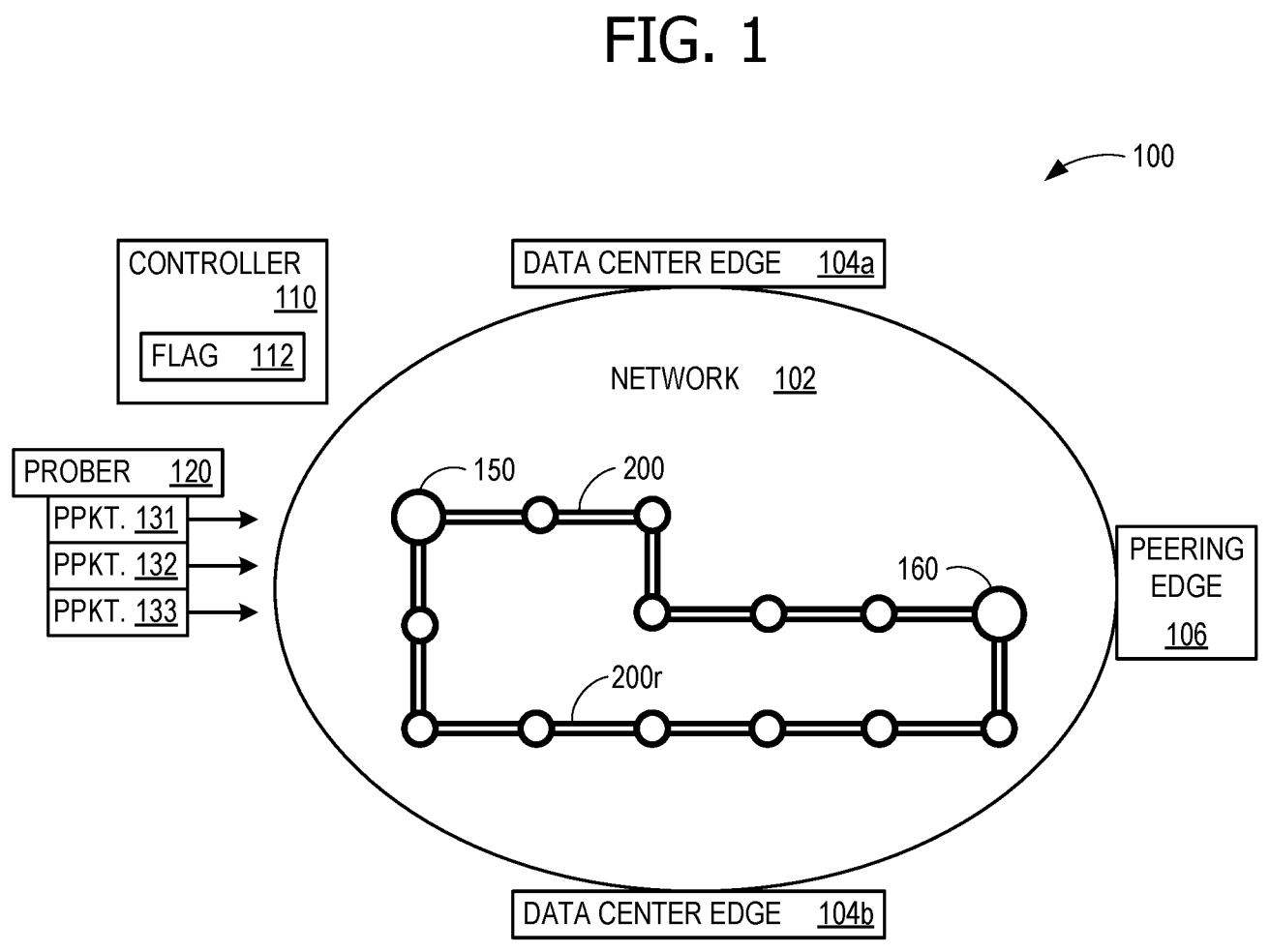

FIG. 1 illustrates an example architecture 100 that advantageously provides for bi-directional tunnel probing, tunnel probing in a multi-realm network, and bi-directional tunnel probing in a multi-realm network. Network 102 comprises a packet switched wide area network (WAN) that moves data traffic among data centers and cloud resource users, for example by moving data among a data center edge 104a, a data center edge 104b, and a peering edge 106.

Network 102 may use common routing protocols such as are used for the internet. Next hop (NH) routing, for example using a segment identifier (SID) may be handled by a routing protocol such as intermediate system to intermediate system (ISIS). ISIS is a routing protocol designed to move information efficiently within a computer network, a group of physically connected computers or similar devices. It accomplishes this by determining the shortest path for data through a packet switching network.

Additionally, network 102 may use multiprotocol label switching (MPLS). MPLS is a routing technique in telecommunications networks that directs data from one node to the next based on labels rather than network addresses. A label-switched path (LSP) is a path through an MPLS network. The path begins at a label edge router (LER), which makes a decision on which label to prefix to a packet. The router that prefixes the MPLS header to a packet may be labeled an ingress router. Routers between the ingress router and the final router, an egress router, are transit routers, which are also known as label switch routers (LSRs) in an MPLS network.

The ingress router forwards the packet to the next router in the path, which in some scenarios, may swap the label within the MPLS header. Packet-forwarding decisions are made based on the contents of the MPLS label, without the need to examine the packet itself. When an LSR receives a packet, it uses the label included in the packet header as an index to determine the next hop on the LSP and a corresponding label for the packet from a lookup table. Some MPLS networks, such as network 102, use penultimate hop popping (PHP), in which the outermost label of an MPLS tagged packet is removed by an LSR before the packet is passed to the (adjacent) final router in the LSP. LSPs are unidirectional; they enable a packet to be label switched through an MPLS network from a source endpoint to a destination endpoint.

LSPs are also known as tunnels. To provide efficient and reliable traffic flow for network 102, a traffic engineering controller 110 determines a set of tunnels for data packets to traverse within network 102. Traffic engineering controller 110 may determine the set of tunnels to optimal a performance metric, such as maximizing throughput for network 102. Prior to using a tunnel, traffic engineering controller 110 installs routes on each router included in the tunnel, to minimize the risk of dropping a packet.

In the illustrated example, a prober 120 tests a tunnel 200 to determine the liveness, or availability, of tunnel 200. Tunnel 200 originates at a tunnel source router 150 and terminates at a tunnel destination router 160, and is shown and described in further detail below in relation to FIG. 2. To test the availability (liveness) of tunnel 200, prober 120 sends probe packets along tunnel 200. These include a probe packet 131, a probe packet 132, and a probe packet 133, which may be identical with the exception of items that are necessarily different, such as packet numbers and timestamps. A probe packet is created to be routed from tunnel source router 150 to tunnel destination router 160, and return. Tunnel source router 150 reports the return of a probe packet (e.g., forwards the probe packet) to prober 120 so that prober 120 can determine that tunnel 200 is available (live) and, in some examples, also estimate transit time. If tunnel 200 is live, prober 120 sets flag 112 to indicate that tunnel 200 is available.

A lost probe packet, or a threshold number of consecutive lost probe packets, is an indication that tunnel 200 is unavailable (not live). Upon a sufficient number of lost probe packets, prober 120 determines that tunnel 200 is unavailable (not live) and sets flag 112 to indicate that tunnel 200 is unavailable. When traffic engineering controller 110 receives topology information and demand information for the next round of tunnel creation, a new tunnel 200r may be created to take over traffic that had been routed through tunnel 200, if the traffic demand still warrants a tunnel in that location, with a similar route. Tunnel 200r may be created as part of a larger set (e.g., thousands of tunnels may be created as part of the new set).

In some examples, probe packets are sent at 100 millisecond (ms) intervals. The probe packet interval is independent of the round-trip transit time, so multiple probe packets may be in flight at any given time. If the number of lost consecutive probe packets is set at three, and the probe packet interval is 100 ms, then the amount of time needed to detect a failed tunnel is approximately 300 ms plus the expected round trip transit time of a probe packet. Probe packets may be sent at different intervals (e.g., 10 ms, 200 ms etc.).

Although only two tunnels are shown, it should be understood that some examples may use a significantly larger number of tunnels, such as numbering in the thousands or more.

FIG. 2 illustrates further detail for tunnel 200, such as may be used in the example architecture of FIG. 1. As illustrated, tunnel 200 comprises tunnel source router 150, a router 151, a router 152, a router 153, a router 154, and tunnel destination router 160. Thus, tunnel 200 comprises an ordered set of routers 210, which using the element numbers shown in FIG. 2 is {150, 151, 152, 153,154, 160}. In this order, router 154 is the penultimate router of tunnel 200, designated as penultimate router 220. Traffic engineering controller 110 reuses available data tunnels in the reverse direction when practical, so another tunnel is reverse tunnel 202 that has an ordered set of routers 212 {160, 154, 153, 152, 151, 150} that is the reverse of ordered set of routers 210 (for tunnel 200). In reverse tunnel 202, router 151 is penultimate router 220. It should be understood that some examples may use a different number of routers in a tunnel.

Even without MPLS and tunnels, each of routers 150-154, and 160 has its own routing logic 230. Routing logic 230 is able to use segment routing, for example using SIDs created by ISIS or another routing protocol that implements segment routing. ISIS comprises distributed logic in each router that determines a shortest path and installs routes. For an adjacent router, the shortest path is an interface to the adjacent router. Thus, even without tunnel labels or using MPLS, router 154 is able to route a packet (e.g., probe packet 131) to tunnel destination router 160 using segment routing. Similarly, router 151 is able to route a packet (e.g., returning probe packet 131) to tunnel source router 150 using segment routing for the reverse direction.

Traffic engineering controller 110 programs each of routers 150-154 with the tunnel label for tunnel 200 using an agent, shown as tunnel engineering logic 232, in each of routers 150-154. When probe packet 131 is generated by tunnel source router 150 for its transit through tunnel 200, tunnel source router 150 determines the forwarding equivalence class (FEC) for the packet and then attaches an envelope (e.g., comprising a newly created MPLS header). In some examples, the MPLS header initially comprises an egress site label. Probe packet 131 is then passed on to the next hop router for tunnel 200, which is router 151. In the illustrated example, router 151 swaps the egress site label in the MPLS for a traffic engineering path label.

Subsequent routers 152 and 153 retain the traffic engineering path label, in some examples, until router 154 removes it in the penultimate hop popping scheme. Tunnel engineering logic 232 has a label look up and swap capability, as well as a pop and push capability. Router 154 sends probe packet 131 out of an interface that goes directly to tunnel destination router 160. This results in three phases of packet flow: traffic steering, traffic engineering, and segment routing.

With this scheme, traffic engineering controller 110 only needs to program routers up through penultimate router 220 (e.g., router 154) for the forward direction of tunnel 200. Tunnel destination router 160 does not need to be programmed for tunnel 200. However, for reverse tunnel 202, the situation is different. All routers under the control of traffic engineering controller 110 also need to be programmed by traffic engineering controller 110 for reverse tunnel 202. If tunnel destination router 160 is under the control of traffic engineering controller 110, then traffic engineering controller 110 programs tunnel destination router 160 and all of routers 151-154 for reverse tunnel 202. Tunnel source router 150 does not need to be programmed for reverse tunnel 202, since it is the final router for reverse tunnel 202.

Figure 3:
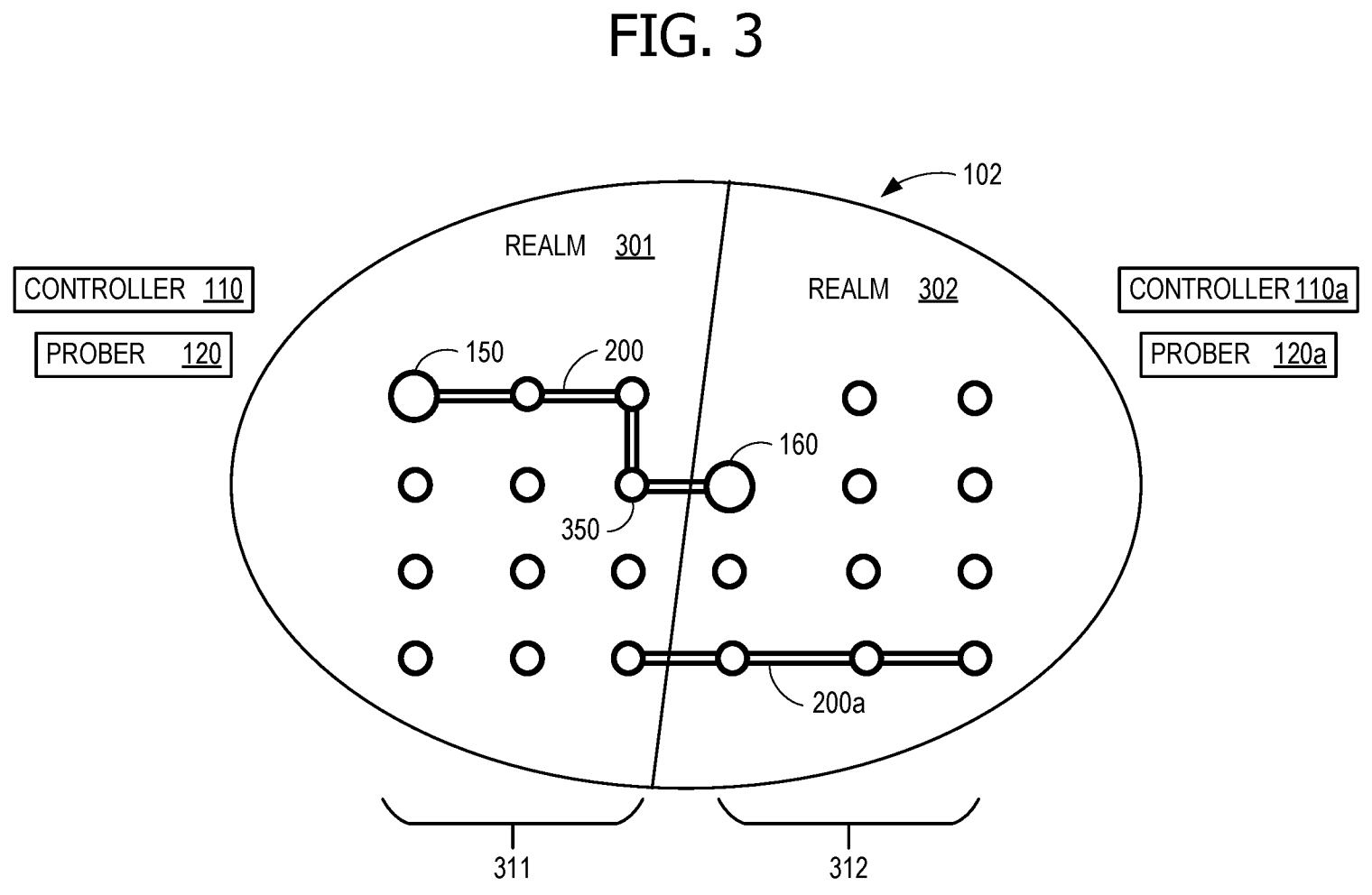

A scenario in which tunnel destination router 160 is not under the control of traffic engineering controller 110 is shown in FIG. 3. In FIG. 3, network 102 is a multi-realm network and is shown as being sliced into two realms (or slices), a realm 301 and a realm 302. It should be understood that a different number of realms may be used in some examples.

Traffic engineering controller 110 controls a set of routers 311 within realm 301 to provide tunnels such as tunnel 200, and prober 120 probes tunnels originating within realm 301. A traffic engineering controller 110*a* controls a set of routers 312 within realm 302 to provide tunnels such as tunnel 200*a*, and a prober 120*a* probes tunnels originating within realm 302. A tunnel may be entirely within a realm or may originate within one realm and terminate at a boundary router in an adjacent realm. A boundary router is the first router encountered across a realm boundary.

In the illustrated example, tunnel destination router 160 is a boundary router for realm 302. Tunnel 200 originates within realm 301 and all routers within tunnel 200, between tunnel source router 150 and penultimate router 350 (e.g., routers 151-154 in FIG. 2) are within realm 301. Tunnel 200 terminates at tunnel destination router 160 within realm 302, and router 154 (also identified as penultimate router 350) is the final router of ordered set of routers 210 that is within realm 301.

Another tunnel (not shown) may originate at tunnel destination router 160 and pass further through realm 302, making tunnel destination router 160 a tunnel source router for that other tunnel. Similar to tunnel 200, but going in the opposite direction, tunnel 200*a* originates within realm 302 and terminates at a boundary router within realm 301. Another tunnel (not shown) may carry traffic further into realm 301.

In this illustrated scenario, traffic engineering controller 110*a* controls tunnel destination router 160. Because tunnels are specific to realms, traffic engineering controller 110*a* has no knowledge of reverse tunnel 202 and so cannot program tunnel destination router 160 for reverse tunnel 202. This means that reverse tunnel 202 starts at router 154, instead of tunnel destination router 160. Thus, a way to get probe packet 131 back to router 154 is needed. A solution to this is illustrated in FIG. 4C.

Figure 4B:
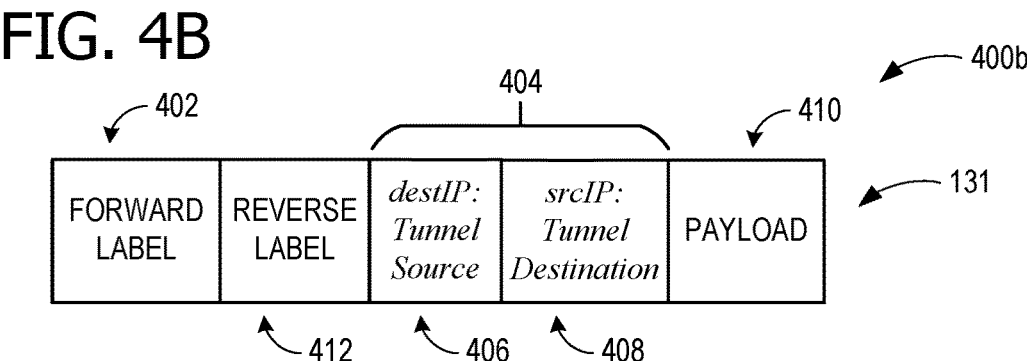
Figure 4C:
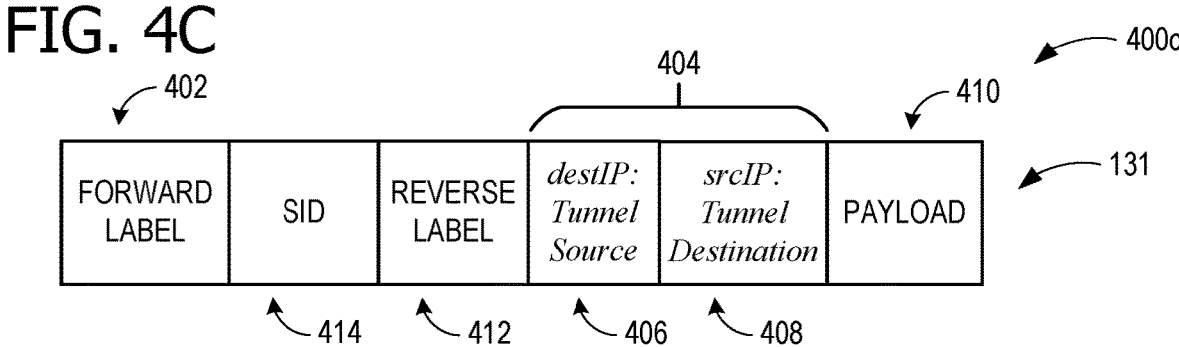

FIGS. 4A, 4B, and 4C illustrate exemplary probe packet envelopes. FIG. 4A shows a scenario 400*a* in which probe packet 131 is a uni-directional probe packet used for both intra-realm and inter-realm probing. Probe packet 131 has a forward tunnel label 402, an IP packet header 404, and a payload 410. IP packet header 404 has a source field 406, which is shown as "destIP Tunnel Source", indicating that tunnel source router 150 is the packet destination, and a destination field 408, which is shown as "srcIP Tunnel Destination", indicating that tunnel destination router 160 is the packet source. Probe packet 131 was not assembled at tunnel destination router 160, but IP packet header 404 is formulated in the manner that it is to ensure that probe packet 131 is returned to tunnel source router 150 in a way that probe packet 131 can be forwarded to prober 120 using existing standard packet routing capability.

In scenario 400*a*, probe packet 131 follows a path 500*a* shown in FIG. 5A. That is, probe packet 131 follows tunnel 200 from tunnel source router 150 to tunnel destination router 160, and then takes any available path back to tunnel source router 150. Probe packet 131 is routed from tunnel source router 150 to router 154 using forward tunnel label 402. Forward tunnel label 402 may start as an egress site label and be swapped to a traffic engineering path label by router 151, in some examples.

Router 154, receiving probe packet 131 with forward tunnel label 402, pops off (strips) forward tunnel label 402, leaving probe packet 131 with only IP packet header 404 and payload 410. Router 154 then uses segment routing to transmit probe packet 131 to tunnel destination router 160. Tunnel destination router 160, seeing IP packet header 404, transmits probe packet 131 back to tunnel source router 150 using any available route (i.e., not using a defined tunnel). It is possible that the same set of routers 151-154 is used, but this is up to chance.

FIG. 4B shows a scenario 400*b* in which probe packet 131 is a bi-directional intra-realm probe packet. Probe packet 131 has forward tunnel label 402, IP packet header 404, and payload 410, but also has a reverse tunnel label 412 between forward tunnel label 402 and IP packet header 404. Reverse tunnel label 412 is for reverse tunnel 202, so probe packet 131 follows a path 500*b* shown in FIG. 5B. That is, probe packet 131 follows tunnel 200 from tunnel source router 150 to tunnel destination router 160, and then follows reverse tunnel from tunnel destination router 160 to tunnel source router 150.

This time, when router 154 pops off (strips) forward label 402, the next outermost envelope is reverse tunnel label 412. When tunnel destination router 160 sees reverse tunnel label 412, tunnel destination router 160 routes probe packet 131 back to tunnel source router 150 using reverse tunnel 202. During the return trip, router 151 pops off (strips) reverse tunnel label 412, leaving probe packet 131 with only IP packet header 404 and payload 410. Router 151 then uses segment routing to transmit probe packet 131 to tunnel source router 150.

Whereas FIGS. 4B and 5B depict an intra-realm tunnel 200 (e.g., entirely within a single realm), FIGS. 4C and 5C depict an inter-realm tunnel 200 (e.g., tunnel 200 spans realms 301 and 302). Probe packets 132 and 133 will have the same envelope and addressing as probe packet 131, such as the same forward tunnel label 402, SID 414, reverse tunnel label 412, and IP packet header 404. Some items may necessarily differ, such as packet number and timestamps, and other content of payload 410 may also differ among probe packets 131-133, in some examples.

FIG. 4C shows a scenario 400c in which probe packet 131 is a bi-directional inter-realm probe packet in a multi-realm version of network 102. Probe packet 131 has forward tunnel label 402, SID 414, reverse tunnel label 412, IP packet header 404, and payload 410. In scenario 400c, probe packet 131 follows a path 500c as shown in FIG. 5C. That is, probe packet 131 follows tunnel 200 from tunnel source router 150 to tunnel destination router 160. Router 154 pops off (strips) forward tunnel label 402, leaving probe packet 131 with SID 414 in the outermost envelope. When tunnel destination router 160 sees SID 414, tunnel destination router 160 routes probe packet 131 back to router 154 using segment routing. SID 414 is stripped off and router 154 sees reverse tunnel label 412. Router 154 then uses reverse tunnel label 412 to transmit probe packet 131 to tunnel source router 150, where router 151 strips off reverse tunnel label 412, leaving IP packet header 404.

Figure 6:
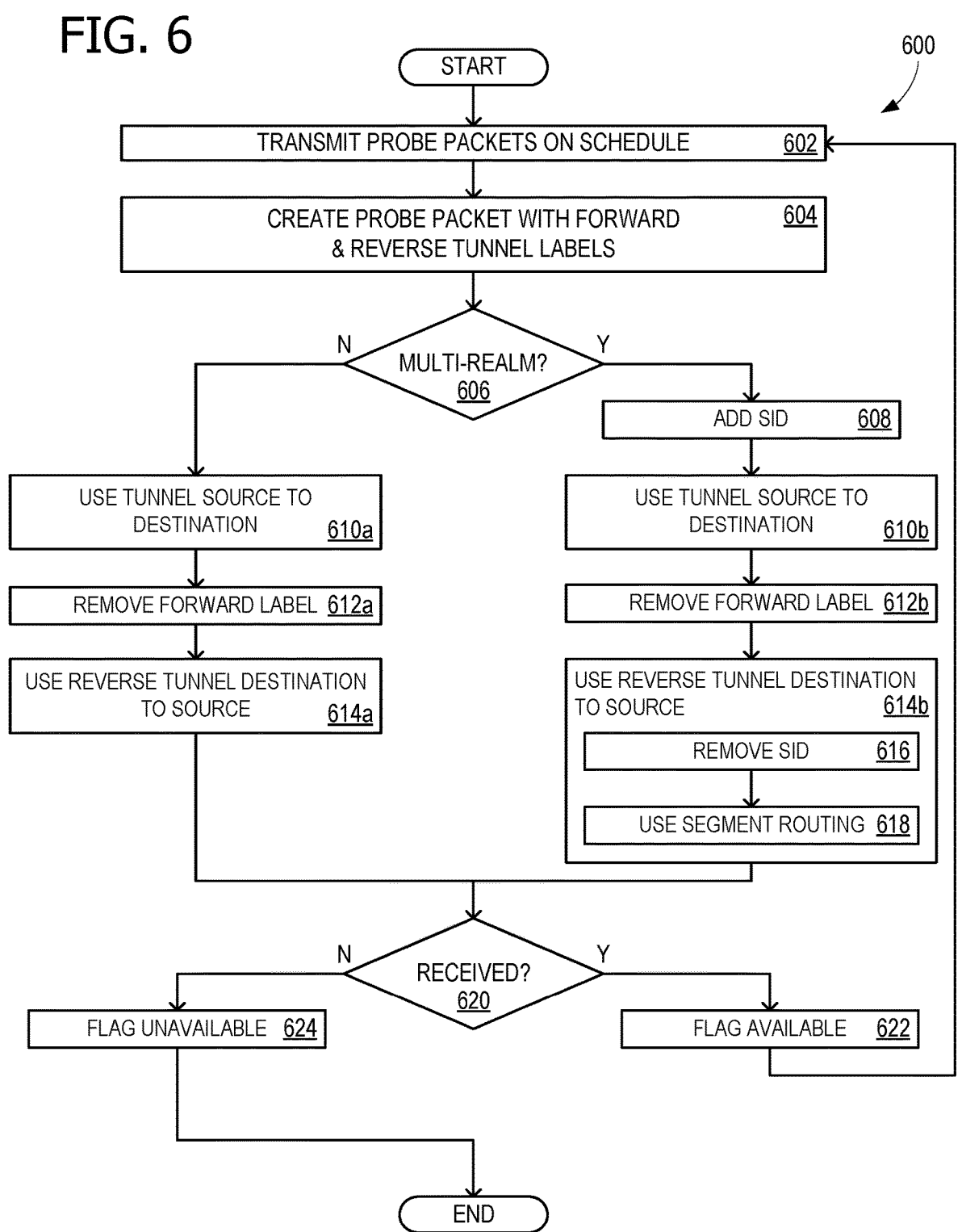

FIG. 6 shows a flowchart 600 illustrating exemplary operations that may be performed by architecture 100. In some examples, operations described for flowchart 600 are performed by computing device 900 of FIG. 9. Flowchart 600 commences by transmitting probe packets matching the configuration of probe packet 131 on a periodic schedule, as operation 602. Operation 602 is ongoing while tunnel 200 remains alive (available), and includes the remainder of flowchart 600, up through operation 622. For flowchart 600, probe packets 131-133 each comprises a bi-directional probe packet.

Operation 604 creates probe packet 131 for tunnel 200. Probe packet 131 comprises forward tunnel label 402, reverse tunnel label 412, and IP packet header 404. Decision operation 606 splits flowchart 600 into a single-realm process (operations 610a, 612a, and 614a) and a multi-realm process (operations 608, 610b, 612b, 614b, 616, and 618).

For multi-realm scenarios, probe packets 131-133 each comprises a bi-directional intra-realm probe packet, and operation 608 adds SID 414 between forward tunnel label 402 and reverse tunnel label 412. SID 414 identifies the final router (e.g., router 154) of ordered set of routers 210 that is within realm 301, and is used to indicate, to tunnel destination router 160, to transmit probe packet 131 to router 154.

Operations 610a and 610b are similar and transmit probe packet 131 from tunnel source router 150 to tunnel destination router 160 along tunnel 200 using forward tunnel label 402. Operations 612a and 612b are also similar, in which penultimate router 220 (in this example, router 154) removes forward tunnel label 402.

Operation 614a is for the single-realm activity, whereas operation 614b is for multi-realm, and includes operations 616 and 618. Operations 614a and 614b are similar in that they both use reverse tunnel label 412 to transmit probe packet 131 from tunnel destination router 160 to tunnel source router 150 along tunnel 200 in a reverse direction (e.g., reverse tunnel 202). However, operations 614a and 614b differ in that, in operation 614a, tunnel destination router 160 uses reverse tunnel label 412, whereas in operation 614a, tunnel destination router 160 uses SID 414 to first reach router 154 and then router 154 starts using reverse tunnel label 412.

In operation 616, tunnel destination router 160 removes SID 414 to expose reverse tunnel label 412, and uses segment routing in operation 618 to transmit probe packet 131 to router 154. Decision operation 620 determines whether probe packets, including probe packet 131, are received or lost. This comprises waiting for an expected latency allowance time, for the probe packets' round trip to tunnel destination router 160 and back. If probe packet 131 is received, then based on at least tunnel source router 150 receiving probe packet 131 back from tunnel destination router 160, tunnel 200 is flagged as available in operation 622. Flowchart 600 then returns to operation 602 to continue probing tunnel 200. In the second pass, operations 604-620 operate on probe packet 132, as described above for probe packet 131. Probe packets 131, 132 and 133 each have the same forward tunnel label 402, the same reverse tunnel label 412, and the same IP packet header 404 and, if probe packet 131 has SID 414, also the same SID 414.

Otherwise, if a probe packet is lost, such as probe packet 131, 132, or 133 (or some other threshold count), then based on at least tunnel source router 150 not receiving a probe packet 132 (or a threshold count of consecutive probe packets), tunnel 200 is flagged as unavailable.

Figure 7:
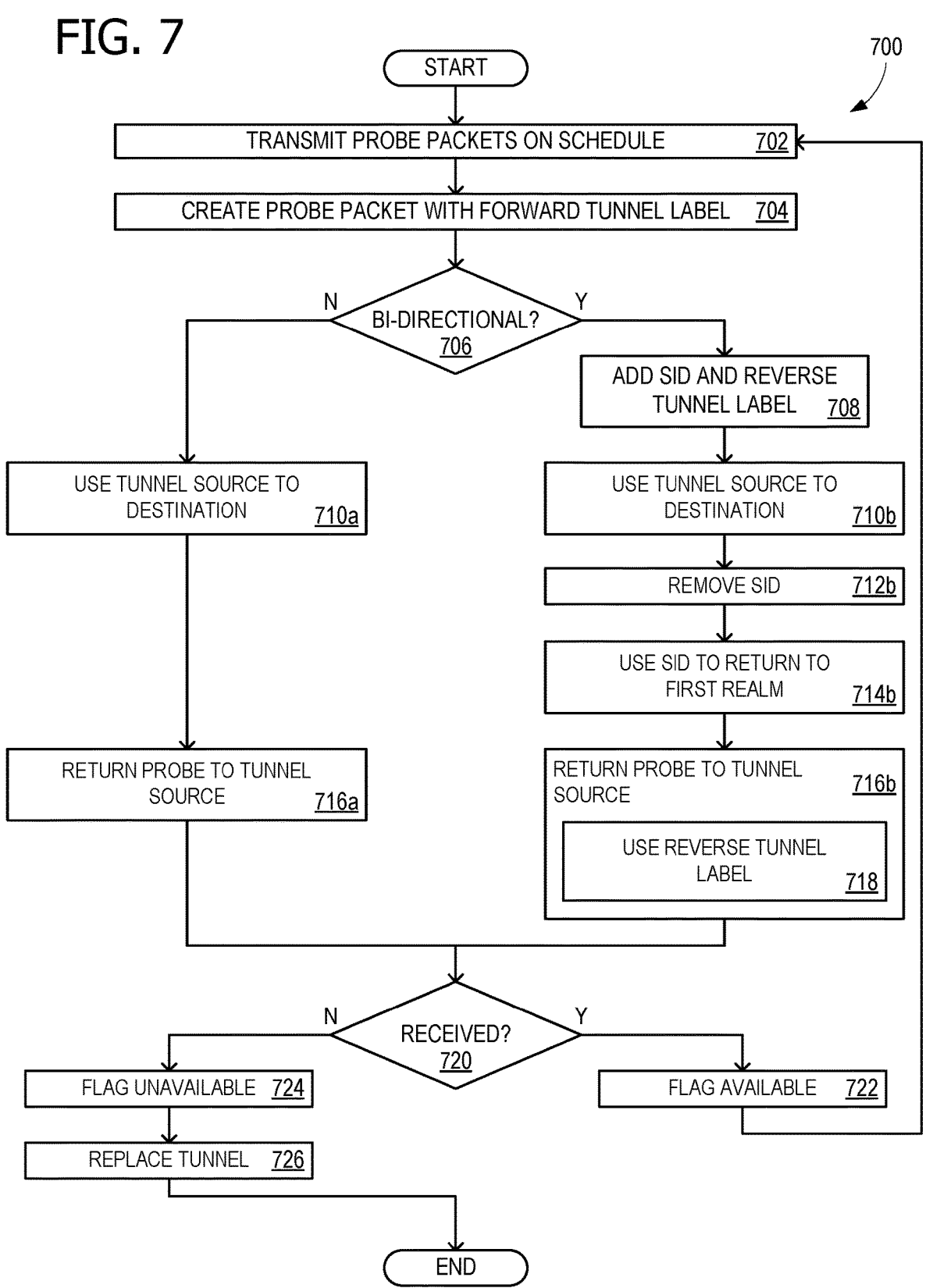

FIG. 7 shows a flowchart 700 illustrating exemplary operations that may be performed by architecture 100. In some examples, operations described for flowchart 700 are performed by computing device 900 of FIG. 9. Flowchart 700 commences by transmitting probe packets matching the configuration of probe packet 131 on a periodic schedule, as operation 702. Operation 702 is ongoing while tunnel 200 remains alive (available), and includes the remainder of flowchart 700, up through operation 722. For flowchart 700, network 102 is multi-realm and probe packets 131-133 each comprises an inter-realm probe packet.

Operation 704 creates probe packet 131 for tunnel 200. Probe packet 131 comprises forward tunnel label 402 and IP packet header 404. Decision operation 706 splits flowchart 700 into a uni-directional packet probing process (operations 710a, 712a, 714a, and 716a) and a bi-directional packet probing process (operations 708, 710b, 712b, 714b, 716b, and 718). The effect of operations 704, 708, 710b, 712b, 714b, 716b, and 718 of flowchart 700 is similar to the effect of operations 604, 608, 610b, 612b, 614b, 616, and 618 of flowchart 600.

For multi-realm, probe packets 131-133 each comprises a bi-directional inter-realm probe packet, and operation 708 adds SID 414 and reverse tunnel label 412 between forward tunnel label 402 and IP packet header 404. Probe packets 131, 132 and 133 each have the same forward tunnel label 402, the same SID 414, the same reverse tunnel label 412, and the same IP packet header 404.

Operations 710a and 710b are similar and transmit probe packet 131 from tunnel source router 150 to tunnel destination router 160 along tunnel 200 using forward tunnel label 402. Operations 712a and 712b are also similar, in which tunnel destination router 160 removes SID 414. Operations 714a and 714b are also similar, in which tunnel destination router 160 uses SID 414 with segment routing to transmit probe packet 131 from tunnel destination router 160 to router 154.

Operation 716a is for the uni-directional probing, whereas operation 716b is for bi-directional and includes operation 718. Operations 716a and 716b are similar in that they both transmit probe packet 131 from tunnel destination router 160 to tunnel source router 150. However, operations 716a and 716b differ in that, in operation 716a, router 154 uses IP packet header 404 to reach tunnel source router 150, which might not take the reverse path of tunnel 200 (e.g., reverse tunnel 202), whereas in operation 716*b*, router 154 uses reverse tunnel label 412 to reach tunnel source router 150 along tunnel 200 in a reverse direction (e.g., reverse tunnel 202). The use of reverse tunnel label 412 to reach tunnel source router 150 is shown as operation 718.

Decision operation 720 is a duplicate of decision operation 620 of flowchart 600. Similarly, operation 722 is a duplicate of operation 622; operation 724 is a duplicate of operation 624; and operation 726 is a duplicate of operation 626.

FIG. 8 shows a flowchart 800 illustrating exemplary operations that may be performed by architecture 100. In some examples, operations described for flowchart 800 are performed by computing device 900 of FIG. 9. Flowchart 800 commences with operation 802, which includes creating, in a packet switched network, a first probe packet for a first tunnel, the first tunnel comprising an ordered set of routers and the first probe packet comprising: a forward tunnel label; a reverse tunnel label; and an IP packet header.

Operation 804 includes, using the forward tunnel label, transmitting the first probe packet from a tunnel source router to a tunnel destination router along the first tunnel. Operation 806 includes, using the reverse tunnel label, transmitting the first probe packet from the tunnel destination router to the tunnel source router along the first tunnel in a reverse direction. Operation 808 includes, based on at least receiving, by the tunnel source router, from the tunnel destination router, the first probe packet, flagging the first tunnel as available.

Additional Examples

An example system comprises: a processor; and a computer-readable medium storing instructions that are operative upon execution by the processor to: create, in a packet switched network, a first probe packet for a first tunnel, the first tunnel comprising an ordered set of routers and the first probe packet comprising: a forward tunnel label; a reverse tunnel label; and an IP packet header; using the forward tunnel label, transmit the first probe packet from a tunnel source router to a tunnel destination router along the first tunnel; using the reverse tunnel label, transmit the first probe packet from the tunnel destination router to the tunnel source router along the first tunnel in a reverse direction; and based on at least receiving, by the tunnel source router, from the tunnel destination router, the first probe packet, flag the first tunnel as available.

An example computer-implemented method comprises: creating, in a packet switched network, a first probe packet for a first tunnel, the first tunnel comprising an ordered set of routers and the first probe packet comprising: a forward tunnel label; a reverse tunnel label; and an IP packet header; using the forward tunnel label, transmitting the first probe packet from a tunnel source router to a tunnel destination router along the first tunnel; using the reverse tunnel label, transmitting the first probe packet from the tunnel destination router to the tunnel source router along the first tunnel in a reverse direction; and based on at least receiving, by the tunnel source router, from the tunnel destination router, the first probe packet, flagging the first tunnel as available.

One or more example computer storage devices have computer-executable instructions stored thereon, which, on execution by a computer, cause the computer to perform operations comprising: creating, in a packet switched network, a first probe packet for a first tunnel, the first tunnel comprising an ordered set of routers and the first probe packet comprising: a forward tunnel label; a reverse tunnel label; and an IP packet header; using the forward tunnel label, transmitting the first probe packet from a tunnel source router to a tunnel destination router along the first tunnel; using the reverse tunnel label, transmitting the first probe packet from the tunnel destination router to the tunnel source router along the first tunnel in a reverse direction; and based on at least receiving, by the tunnel source router, from the tunnel destination router, the first probe packet, flagging the first tunnel as available.

Alternatively, or in addition to the other examples described herein, examples include any combination of the following:

creating, in the packet switched network, a second probe packet for the first tunnel;

the second probe packet comprises: a forward tunnel label; a reverse tunnel label; and an IP packet header;

using the forward tunnel label of the second probe packet, transmitting the second probe packet from the tunnel source router to the tunnel destination router along the first tunnel;

based on at least not receiving, by the tunnel source router, the second probe packet, flagging the first tunnel as unavailable;

the reverse direction of the first tunnel comprises a second tunnel;

the packet switched network comprises at least two realms;

the tunnel source router is within a first realm of the two realms;

the tunnel destination router is within a second realm of the two realms;

routers of the tunnel between the tunnel source router and the tunnel destination router are within the first realm;

the first probe packet further comprises: an SID between the forward tunnel label and the reverse tunnel label;

removing, by the tunnel destination router, the SID;

using the SID, transmitting the first probe packet from the tunnel destination router to a final router of the ordered set of routers that is within the first realm;

transmitting the first probe packet from the tunnel destination router to the tunnel source router along the first tunnel using the reverse tunnel label comprises, using the reverse tunnel label, transmitting the first probe packet from the final router of the ordered set of routers that is within the first realm to the tunnel source router;

removing, by a penultimate router in the ordered set of routers of the first tunnel, the forward tunnel label;

transmitting probe packets matching the configuration of the first probe packet on a periodic schedule;

transmitting the first probe packet from the final router of the ordered set of routers that is within the first realm to the tunnel source router comprises, using the reverse tunnel label, transmitting the first probe packet from the final router of the ordered set of routers that is within the first realm to the tunnel source router along the first tunnel in a reverse direction;

the first probe packet comprises a bi-directional probe packet;

the first probe packet comprises an intra-realm probe packet;

the first probe packet comprises an inter-realm probe packet;

the first probe packet comprises a bi-directional inter-realm probe packet;

the second probe packet comprises a bi-directional probe packet;

the second probe packet comprises an intra-realm probe packet;

the second probe packet comprises an inter-realm probe packet;

the second probe packet comprises a bi-directional inter-realm probe packet;

the tunnel source router adds the forward tunnel label and the reverse tunnel label to the first probe packet;

the tunnel source router adds the forward tunnel label and the reverse tunnel label to the second probe packet;

the second tunnel comprises an ordered set of routers that has a reverse order of the first tunnel;

the SID identifies the final router of the ordered set of routers that is within the first realm;

the SID indicates, to the tunnel destination router, to transmit the first probe packet to the final router of the ordered set of routers that is within the first realm;

based on at least not receiving, by the tunnel source router, a threshold count of consecutive probe packets, flagging the first tunnel as unavailable;

in the absence of a reverse tunnel label, using the IP packet header to route the first probe packet to the tunnel source router;

the first tunnel comprises an MPLS tunnel; and determining that a probe packet is not received comprises waiting for an expected latency allowance time.

While the aspects of the disclosure have been described in terms of various examples with their associated operations, a person skilled in the art would appreciate that a combination of operations from any number of different examples is also within scope of the aspects of the disclosure.

Example Operating Environment

FIG. 9 is a block diagram of an example computing device 900 (e.g., a computer storage device) for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more buses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer storage memory," "memory," and "memory devices" are synonymous terms for the memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represents an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:

create, in a packet switched network, a first probe packet and a second probe packet for a first tunnel, the first tunnel comprising an ordered set of routers and the first probe packet and the second probe packet each comprising:

a forward tunnel label;

a reverse tunnel label; and an internet protocol (IP) packet header;

using the forward tunnel label, transmit the first probe packet from a tunnel source router to a tunnel destination router along the first tunnel;

using the reverse tunnel label, transmit the first probe packet from the tunnel destination router to the tunnel source router along the first tunnel in a reverse direction;

before receiving, by the tunnel source router, from the tunnel destination router, the first probe packet, transmit the second probe packet from a tunnel source router to a tunnel destination router along the first tunnel; and based on at least receiving, by the tunnel source router, from the tunnel destination router, one of the first probe packet and the second probe packet, flag the first tunnel as available.

2. The system of claim 1, wherein the instructions are further operative to:

create, in the packet switched network, a second probe packet for the first tunnel, the second probe packet comprising:

the forward tunnel label;

the reverse tunnel label; and the IP packet header;

using the forward tunnel label of the second probe packet, transmit the second probe packet from the tunnel source router to the tunnel destination router along the first tunnel; and based on at least not receiving, by the tunnel source router, the second probe packet, flag the first tunnel as unavailable.

3. The system of claim 1, wherein the reverse direction of the first tunnel comprises a second tunnel.

4. The system of claim 1, wherein the packet switched network comprises at least two realms;

wherein the tunnel source router is within a first realm of the at least two realms;

wherein the tunnel destination router is within a second realm of the at least two realms;

wherein routers of the first tunnel between the tunnel source router and the tunnel destination router are within the first realm; and wherein the first probe packet further comprises:

a segment identifier (SID) between the forward tunnel label and the reverse tunnel label.

5. The system of claim 4, wherein the instructions are further operative to:

remove, by the tunnel destination router, the SID; and using the SID, transmit the first probe packet from the tunnel destination router to a final router of the ordered set of routers that is within the first realm; and wherein transmitting the first probe packet from the tunnel destination router to the tunnel source router along the first tunnel using the reverse tunnel label comprises:

using the reverse tunnel label, transmitting the first probe packet from the final router of the ordered set of routers that is within the first realm to the tunnel source router.

6. The system of claim 1, wherein the instructions are further operative to:

remove, by a penultimate router in the ordered set of routers of the first tunnel, the forward tunnel label.

7. The system of claim 1, wherein the instructions are further operative to:

transmit probe packets matching a configuration of the first probe packet on a periodic schedule.

8. The system of claim 1, wherein the first probe packet and the second probe packet each comprise a forward tunnel label, a segment identifier (SID), a reverse tunnel label, and an IP packet header, in that order.

9. A computer-implemented method comprising:

creating, in a packet switched network, a first probe packet and a second probe packet for a first tunnel, the first tunnel comprising an ordered set of routers and the first probe packet and the second probe packet each comprising:

a forward tunnel label;

a reverse tunnel label; and an internet protocol (IP) packet header;

using the forward tunnel label, transmitting the first probe packet from a tunnel source router to a tunnel destination router along the first tunnel;

using the reverse tunnel label, transmitting the first probe packet from the tunnel destination router to the tunnel source router along the first tunnel in a reverse direction;

before receiving, by the tunnel source router, from the tunnel destination router, the first probe packet, transmitting the second probe packet from a tunnel source router to a tunnel destination router along the first tunnel; and based on at least receiving, by the tunnel source router, from the tunnel destination router, one of the first probe packet and the second probe packet, flagging the first tunnel as available.

10. The computer-implemented method of claim 9, further comprising:

creating, in the packet switched network, a second probe packet for the first tunnel, the second probe packet comprising:

the forward tunnel label;

the reverse tunnel label; and the IP packet header;

using the forward tunnel label of the second probe packet, transmitting the second probe packet from the tunnel source router to the tunnel destination router along the first tunnel; and based on at least not receiving, by the tunnel source router, the second probe packet, flagging the first tunnel as unavailable.

11. The computer-implemented method of claim 9, wherein the reverse direction of the first tunnel comprises a second tunnel.

12. The computer-implemented method of claim 9, wherein the packet switched network comprises at least two realms;

wherein the tunnel source router is within a first realm of the at least two realms;

wherein the tunnel destination router is within a second realm of the at least two realms;

wherein routers of the first tunnel between the tunnel source router and the tunnel destination router are within the first realm; and wherein the first probe packet further comprises:

a segment identifier (SID) between the forward tunnel label and the reverse tunnel label.

13. The computer-implemented method of claim 12, further comprising:

removing, by the tunnel destination router, the SID; and using the SID, transmitting the first probe packet from the tunnel destination router to a final router of the ordered set of routers that is within the first realm; and wherein transmitting the first probe packet from the tunnel destination router to the tunnel source router along the first tunnel using the reverse tunnel label comprises:

using the reverse tunnel label, transmitting the first probe packet from the final router of the ordered set of routers that is within the first realm to the tunnel source router.

14. The computer-implemented method of claim 9, further comprising:

removing, by a penultimate router in the ordered set of routers of the first tunnel, the forward tunnel label.

15. The computer-implemented method of claim 9, further comprising:

transmitting probe packets matching a configuration of the first probe packet on a periodic schedule.

16. A computer storage device having computer-executable instructions stored thereon, which, on execution by a computer, cause the computer to perform operations comprising:

creating, in a packet switched network, a first probe packet and a second probe packet for a first tunnel, the first tunnel comprising an ordered set of routers and the first probe packet and the second probe packet each comprising:

a forward tunnel label;

a reverse tunnel label; and an internet protocol (IP) packet header;

using the forward tunnel label, transmitting the first probe packet from a tunnel source router to a tunnel destination router along the first tunnel;

using the reverse tunnel label, transmitting the first probe packet from the tunnel destination router to the tunnel source router along the first tunnel in a reverse direction;

before receiving, by the tunnel source router, from the tunnel destination router, the first probe packet, transmitting the second probe packet from a tunnel source router to a tunnel destination router along the first tunnel; and based on at least receiving, by the tunnel source router, from the tunnel destination router, one of the first probe packet and the second probe packet, flagging the first tunnel as available.

17. The computer storage device of claim 16, wherein the operations further comprise:

creating, in the packet switched network, a second probe packet for the first tunnel, the second probe packet comprising:

the forward tunnel label;

the reverse tunnel label; and the IP packet header;

using the forward tunnel label of the second probe packet, transmitting the second probe packet from the tunnel source router to the tunnel destination router along the first tunnel; and based on at least not receiving, by the tunnel source router, the second probe packet, flagging the first tunnel as unavailable.

18. The computer storage device of claim 16, wherein the reverse direction of the first tunnel comprises a second tunnel.

19. The computer storage device of claim 16, wherein the packet switched network comprises at least two realms;

wherein the tunnel source router is within a first realm of the at least two realms;

wherein the tunnel destination router is within a second realm of the at least two realms;

wherein routers of the first tunnel between the tunnel source router and the tunnel destination router are within the first realm; and wherein the first probe packet further comprises:

a segment identifier (SID) between the forward tunnel label and the reverse tunnel label.

20. The computer storage device of claim 19, wherein the operations further comprise:

removing, by the tunnel destination router, the SID; and using the SID, transmitting the first probe packet from the tunnel destination router to a final router of the ordered set of routers that is within the first realm; and wherein transmitting the first probe packet from the tunnel destination router to the tunnel source router along the first tunnel using the reverse tunnel label comprises:

using the reverse tunnel label, transmitting the first probe packet from the final router of the ordered set of routers that is within the first realm to the tunnel source router.

* * * * *